(12) United States Patent
Wright

(10) Patent No.: US 11,059,409 B2
(45) Date of Patent: Jul. 13, 2021

(54) METHODS AND SYSTEMS ASSOCIATED WITH A MOBILE BIN TIPPER

(71) Applicant: Data Shredding Services of Texas, Inc., Houston, TX (US)

(72) Inventor: Lee Wright, Houston, TX (US)

(73) Assignee: Data Shredding Services of Texas, Inc., Houston, TX (US)

( * ) Notice: Subject to any disclaimer, the term of this patent is extended or adjusted under 35 U.S.C. 154(b) by 0 days.

(21) Appl. No.: 16/715,917

(22) Filed: Dec. 16, 2019

(65) Prior Publication Data
US 2020/0189439 A1    Jun. 18, 2020

Related U.S. Application Data

(60) Provisional application No. 62/780,716, filed on Dec. 17, 2018.

(51) Int. Cl.
*B60P 1/28* (2006.01)
*B60P 1/16* (2006.01)

(52) U.S. Cl.
CPC ............... *B60P 1/283* (2013.01); *B60P 1/162* (2013.01)

(58) Field of Classification Search
CPC .. B60P 1/283; B60P 1/162; B65F 1/12; B65F 1/14; B65F 1/1452; B65F 1/1473; B62B 3/08; B62B 3/104
See application file for complete search history.

(56) References Cited

U.S. PATENT DOCUMENTS

| | | | | | |
|---|---|---|---|---|---|
| 2,260,697 | A | * | 10/1941 | Allen | B65G 67/00 414/421 |
| 2,711,838 | A | * | 6/1955 | Avery | B62B 3/08 414/421 |
| 3,112,835 | A | * | 12/1963 | Gierhart | B62B 3/08 414/420 |
| 3,294,266 | A | * | 12/1966 | Snow | B65G 65/23 414/421 |
| 3,342,358 | A | * | 9/1967 | Toppins | B65G 65/23 414/420 |
| 3,750,810 | A | * | 8/1973 | Stanfill | B60P 1/16 414/421 |
| 3,863,985 | A | * | 2/1975 | Zuber | B62B 3/02 298/2 |
| 3,978,999 | A | * | 9/1976 | Ryder | B65G 65/23 414/421 |
| 4,068,891 | A | * | 1/1978 | Herbst | B62B 3/08 298/22 P |
| 4,280,780 | A | * | 7/1981 | Neufeldt | B65F 1/0033 222/166 |
| 5,002,450 | A | * | 3/1991 | Naab | B65F 3/045 414/303 |
| 5,006,039 | A | * | 4/1991 | Niederer | B60P 1/34 298/17.5 |
| 5,122,027 | A | * | 6/1992 | Tabayashi | B62B 3/104 414/622 |
| 5,288,195 | A | * | 2/1994 | McIntyre | B66F 9/02 110/165 R |
| 5,558,485 | A | * | 9/1996 | Haynes | B65G 65/23 414/421 |

(Continued)

*Primary Examiner* — Kaitlin S Joerger
(74) *Attorney, Agent, or Firm* — Pierson IP, PLLC

(57) ABSTRACT

A mobile bin tipper that is configured to receive, lift, and rotate a bin. The mobile bin tipper quickly and efficiently empty the content of bins into larger containers.

18 Claims, 7 Drawing Sheets

(56) References Cited

U.S. PATENT DOCUMENTS

| | | | | |
|---|---|---|---|---|
| 5,582,500 | A * | 12/1996 | Morris | B65F 1/1452 |
| | | | | 414/422 |
| 5,755,816 | A * | 5/1998 | Schirmer | B65G 7/08 |
| | | | | 211/169.1 |
| 6,966,687 | B1 * | 11/2005 | Elefsrud | B28C 5/4203 |
| | | | | 366/110 |
| 7,018,155 | B1 * | 3/2006 | Heberling | B62B 3/0606 |
| | | | | 414/408 |
| 7,147,360 | B2 * | 12/2006 | Elefsrud | B28C 5/4203 |
| | | | | 366/26 |
| 7,699,065 | B2 * | 4/2010 | Fitzgerald | B03B 9/063 |
| | | | | 134/117 |
| 8,403,617 | B2 * | 3/2013 | Banning | B65G 67/30 |
| | | | | 414/632 |
| 9,126,755 | B2 * | 9/2015 | Walter | B65F 1/1452 |
| 9,242,662 | B2 * | 1/2016 | Scott | B62B 1/14 |
| 9,283,973 | B1 * | 3/2016 | Stone | B62B 1/16 |
| 9,296,326 | B1 * | 3/2016 | Young | B66F 9/0759 |
| 9,393,545 | B1 * | 7/2016 | Koh, II | B65F 1/1452 |
| 10,035,529 | B2 * | 7/2018 | DePadro | B62B 3/027 |
| 10,160,596 | B2 * | 12/2018 | Lawson | E01F 9/623 |
| 10,315,840 | B2 * | 6/2019 | Georgas | B65F 1/12 |
| 10,315,841 | B2 * | 6/2019 | Georgas | B65F 1/1452 |
| 10,336,538 | B1 * | 7/2019 | VandenBerg | B66F 9/19 |
| 2006/0033378 | A1 * | 2/2006 | Sargent | B60P 1/34 |
| | | | | 298/6 |
| 2019/0291950 | A1 * | 9/2019 | Georgas | B65F 1/12 |
| 2020/0217376 | A1 * | 7/2020 | James | B25B 11/02 |

* cited by examiner

METHODS AND SYSTEMS ASSOCIATED WITH A MOBILE BIN TIPPER

TECHNICAL FIELD

This disclosure relates generally to systems and methods for a mobile bin tipper. Specifically, this disclosure relates to a mobile bin tipper that is configured to receive, lift, and rotate bins.

BACKGROUND

A paper shredder is a mechanical device used to cut paper into strips, smaller pieces, etc. Organizations and individuals use shredders to destroy sensitive documents. The sensitive documents are typically stored in bins before being transported to a shredder.

Conventionally, this requires manually moving the sensitive documents into the shredder from the bins, or moving the bins to a remote location to the shredder. These conventional processes fail to maximize efficiency or production, while limiting security of the sensitive documents.

Additionally, when moving the bins to a remote location, it is necessary to swap the bins containing sensitive documents with empty bins. This requires transportation of the vehicle, as well as moving bins within the vehicle, which are arduous and time consuming tasks.

Accordingly, needs exist for improved mobile bin tippers that are configured to receive, lift, and rotate bins allowing for removal of the content of bins.

SUMMARY

Embodiments described herein disclose a mobile bin tipper that is configured to receive, lift, and rotate a bin. Embodiments described herein may be configured to quickly and efficiently empty the content of bins into larger containers. This may reduce the number of bins required to service numerous locations, while also reducing the amount of time required to empty documents within the bins to later shred the documents. Furthermore, the mobile bin tipper may be configured to move in multiple directions, forwards, backwards, horizontally, diagonally, etc. Utilizing the mobile bin tipper, embodiments may process more weight and volume of material than conventional systems, due to the mobility of the mobile bin tipper to access more bins.

Embodiments of the mobile tipper may include a frame, bin receiver, and lifter.

The frame may be configured to support the elements of the mobile bin tipper. A lower surface of the frame may include a base that extends from a proximal end to a distal end of the frame. A first set of wheels maybe coupled to, or close to, the proximal end of the base, and a second set of wheels may be coupled to, or close to, the distal end of the base. The frame may also include a cage that is configured to limit the horizontal movement of a bin responsive to the bin being positioned on the bin receiver.

The bin receiver may be positioned with the frame, and is configured to the bin. The bin receiver may include a front sidewall, lower sidewall, tapered sidewall, lip, and swing.

The front sidewall may be configured to limit the forward movement of the bin, the lower sidewall may be configured to be positioned below the bin, and the tapered sidewall may extend from the front sidewall to the lower sidewall at an angle. The tapered sidewalls may be configured to limit the horizontal movement of a bin positioned within the bin receiver.

The lip may be a vertically adjustable projection, which may be configured to be raised and lowered based on the height of the bin. In embodiments, the lip may be raised or lowered to be positioned adjacent to a rim of the bin, such that a distance from the lower sidewall to the lip may be the same height of the bin. The lip may also be configured to apply a compressive force to against the bin towards lower sidewall. This may secure the bin in place when the bin is rotated.

The swing may be positioned at an angle from a hinge of the frame to the front sidewall of the bin receiver, and the swing may be configured to receive a distal end of an arm of the hydraulic lift. Responsive to the distal end of the arm of the hydraulic lift moving up or down, the swing may cause the bin receiver to correspondingly rotate. The swing may include a plurality of pin holes that are vertically and horizontally offset from each other, wherein each of the pin holes may be configured to receive the distal end of the arm of the hydraulic lift. In embodiments, a maximum angle of rotation of the bin receiver may be based on which of the plurality of pin holes the distal end of the hydraulic arm is coupled to. The maximum angle of rotation may also determine how high a bottom of a bin within the bin receiver may be displaced from a ground surface when being empty. By being able to limit or change a maximum height the bottom of the bin may be positioned from the ground surface, the bin receiver may be configured to be rotated in more confined areas.

The lifter may be configured to raise and rotate the bin receiver. This may enable a bin positioned on the bin receiver to be emptied into a container positioned adjacent to the mobile tipper. The lifter may include a hinge and a hydraulic lift. The hinge may allow the bin receiver to be rotated about an axis of rotation around the hinge via the hydraulic lift and the swing. In embodiments, an arm of the hydraulic lift may extend and contract, wherein in the extended mode the bin may be emptied. Responsive to the arm the hydraulic lift contracting, the bin may be repositioned within the frame.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail.

It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
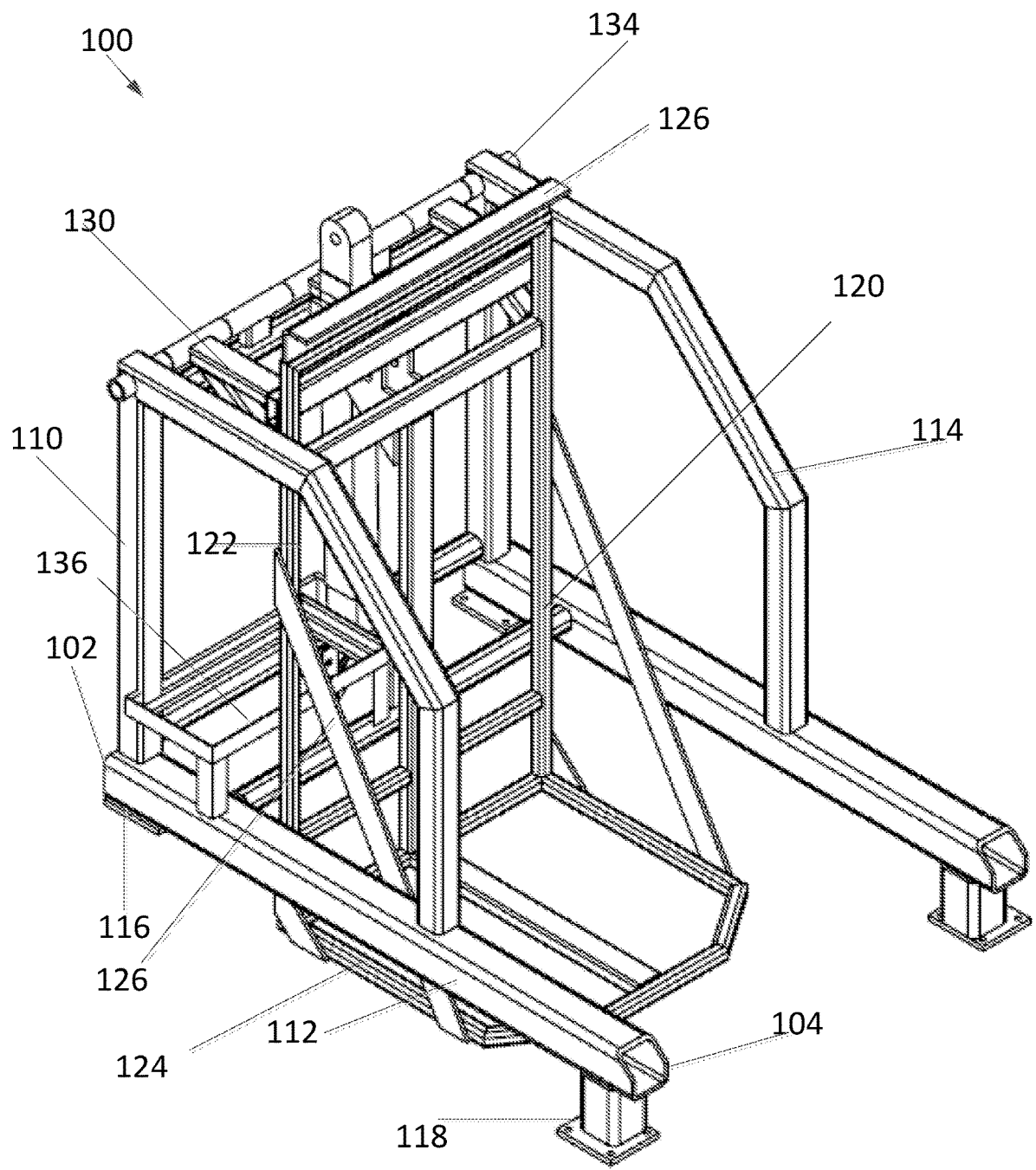
FIG. 1 depicts a mobile bin tipper, according to an embodiment.

FIG. 1 depicts a mobile bin tipper 100, according to an embodiment. Mobile bin tipper 100 may be configured to be moved from a first location to a second location, such as within a warehouse to position within a truck. The mobility of mobile bin tipper 100 may allow receiving bins to be locally emptied without having to be transported to a second location. Mobile bin tipper 100 may include a frame 110, bin receiver 120, and lifter 130.

Frame 110 may be configured to support the elements of the mobile bin tipper 100. Frame 110 may include a base 112, cage 114, first wheel receivers 116, and second wheel receivers 118.

Base 112 may extend from a proximal end 102 of frame 110 to a distal end 104 of frame 110. Base 112 may be the longest element of mobile bin tipper 100, and may be configured to maintain mobile bin tipper 100 in an upright and stable position while transporting and rotating bins. Bases 112 may have a planer upper and lower surface that is configured to be positioned in parallel to a ground surface when bin receiver 120 is being emptied or moved.

Cage 114 may be a device that extends upward from proximal end 102 of base 100, and extends towards distal end 104 of base 199. Cage 114 may be configured to limit the horizontal movement of bins positioned within mobile bin tipper 100. In embodiments, a first side of cage 114 may be positioned planar to proximal end 102, and a second side of cage may be positioned past a mid-point of base 100, which is closer to distal end 104. This may allow cage 114 to encompass a bin positioned within cage 114 without extending along the totality of a longitudinal axis of base 112.

A first set of wheels may be coupled to first wheel receivers 116, which may be positioned on lower surface of base 112 proximate to proximal end 102. A second set of wheels may be coupled to second wheel receivers 112, which is positioned on the lower surface of base 112 proximate to distal end 104. The sets of wheels may be configured to enable mobile bin tipper 100 to move from multiple locations. In embodiments, the first set of wheels and the second set of wheels may have different diameters, wherein the set of wheels proximate to proximal end 102 are larger than the set of wheels proximate to distal end 104. Although having different sizes, the circumferences of the sets of wheels may be configured to be flush with a floor surface such that base 112 is in parallel with the floor surface. In embodiments the first wheel receivers 116 may be vertically offset from the second set of wheel receivers 118, which may allow different sized wheels to be coupled to the different wheel receivers.

Bin receiver 120 may be positioned with the frame 110, and is configured to receive the bin, secure the bin in place, and be rotated around hinge 134. Bin receiver 120 may include a front sidewall 122, lower sidewall 124, tapered sidewall 126, and a lip 128.

Front sidewall 122 may be configured to limit the forward movement of the bin in a direction towards proximal end 102. In embodiments, responsive to positioning a bin on bin receiver 120, the bin may be positioned adjacent to front sidewall 122. Front sidewall 122 may be configured to be positioned between proximal end 102 and distal end 104 of mobile bin tipper 100, in a direction that is perpendicular to base 112, wherein front sidewall 122 may be positioned between a midway point of base 104 and proximal end 102. Front sidewall 122 may have a height such that an upper surface of front sidewall 122 is positioned above cage 114, and a lower surface of front sidewall 122 is positioned below base 112. This may allow the top surface of front sidewall 122 to be rotated, around hinge 134, in front of and over proximal end 102. Furthermore, the positioning of front sidewall 122 may allow the lower surface of first sidewall 122 to be positioned over and in front proximal end 102 when front sidewall 122 is rotated, and behind proximal end 102 when front sidewall 122 is perpendicular to a ground surface.

Lower sidewall 124 may be configured to be positioned on a lower surface of front sidewall 122. Lower sidewall 124 may be configured to be positioned below a bin responsive to positioning a bin on top of bin receiver 120. In embodiments, a length of lower sidewall may be larger than that of a bin, and an outer edge of lower sidewall 124 may be positioned between a front edge of cage 114 and distal end 104 when bin receiver 120 is not rotated. Furthermore, when not tilted lower sidewall 124 may be configured to be positioned below base 112, and flush on a floor surface.

Angled sidewalls 126 may be configured to extend from front sidewall to lower sidewall 122. Angled sidewalls 126 may be configured to be positioned adjacent to the sidewalls of a bin, responsive to positioning the bin on bin receiver 120. Angled sidewalls may also be configured to limit the horizontal movement of the bin.

Lip 128 may be a vertically adjustable projection, which may be configured to be raised and lowered based on the height of the bin. In embodiments, lip 128 may be raised or lowered to be positioned adjacent to a rim of the bin, such that a distance from the lower sidewall 124 to the lip 128 may be the same height of the bin. Lip 128 may also be configured to apply a compressive force to against the bin towards lower sidewall. This may secure the bin in place when the bin is rotated. In embodiments, lip 128 may be configured to be a projection extending away from front sidewall 122, wherein portions of lip 128 may be configured to be positioned within a cavity of front sidewall 122.

Lifter 130 may be a swing, hinged arm, etc. configured to raise and rotate the bin receiver 120. This may enable a bin positioned on the bin receiver 120 to be emptied into a container positioned adjacent to the mobile bin tipper 100, and then revert back to a resting state.

Lifter 130 may include a hydraulic lift (not shown), ledge 132, and hinge 134. The hinge 134 may allow the bin receiver to be coupled with frame 130, and be rotated about an axis of rotation around the hinge via the hydraulic lift. In embodiments, an arm of the hydraulic lift may extend and contract, wherein in the extended mode the bin may be emptied. Responsive to the arm the hydraulic lift contracting, the bin may be repositioned within the frame.

The hydraulic lift may be a device that with an arm that is configured to be extended and retracted, such as a hydraulic cylinder lift. A first end or distal end of the arm may be coupled to ledge 132. Responsive to the arm extending, ledge 132 may move upward and rotate around hinge 134. Responsive to the arm being retracted, ledge 132 may move downward and rotate around hinge 134.

Ledge 132 may be a platform that is configured to interface with the distal end of the arm of the hydraulic lift, and rotate around hinge 134. In embodiments, while the arm is retracted, ledge 132 may be positioned at a downward angle with a first end coupled to hinge 134 and a second end coupled to front sidewall 120. Responsive to ledge 132 moving, bin receiver 120 may correspondingly move. In embodiments, ledge 132 may include a plurality of pin holes that are configured to be coupled to the distal end of the hydraulic lift, wherein each of the pin holes are vertically and/or horizontally offset from each other on ledge 132. Based on the placement of the pin holes the angular rotation, positioning, maximum height, etc. of the bin positioned within bin receiver 120 may change. For example, when the distal end of the hydraulic lift is coupled to a first pin hole at a first position on ledge 132, the maximum height of a rotated bin within a rotated bin receiver 120 may be a first height with a first angular offset. When the distal end of the hydraulic lift is coupled to a second pin hole at a second position on ledge 132, the maximum height of the rotated bin within the rotated bin receiver 120 may be a second height with a second angular offset, wherein the first maximum height and first angular offset are different than the second maximum height and second angular offset, correspondingly.

Hinge 134 may be a mechanical bearing that is configured to couple ledge 132 and frame 134. Hinge 134 may be positioned on frame 110, and allow ledge 132 to rotate responsive to ledge 132 receiving force from the hydraulic lift.

Embodiments may also include a battery storage compartment 136 positioned between frame 110 and bin receiver 120. Battery storage compartment 136 may be a shelf that is configured to hold a battery that powers the hydraulic lift, wherein the battery may be a rechargeable electric battery.

Figure 2:
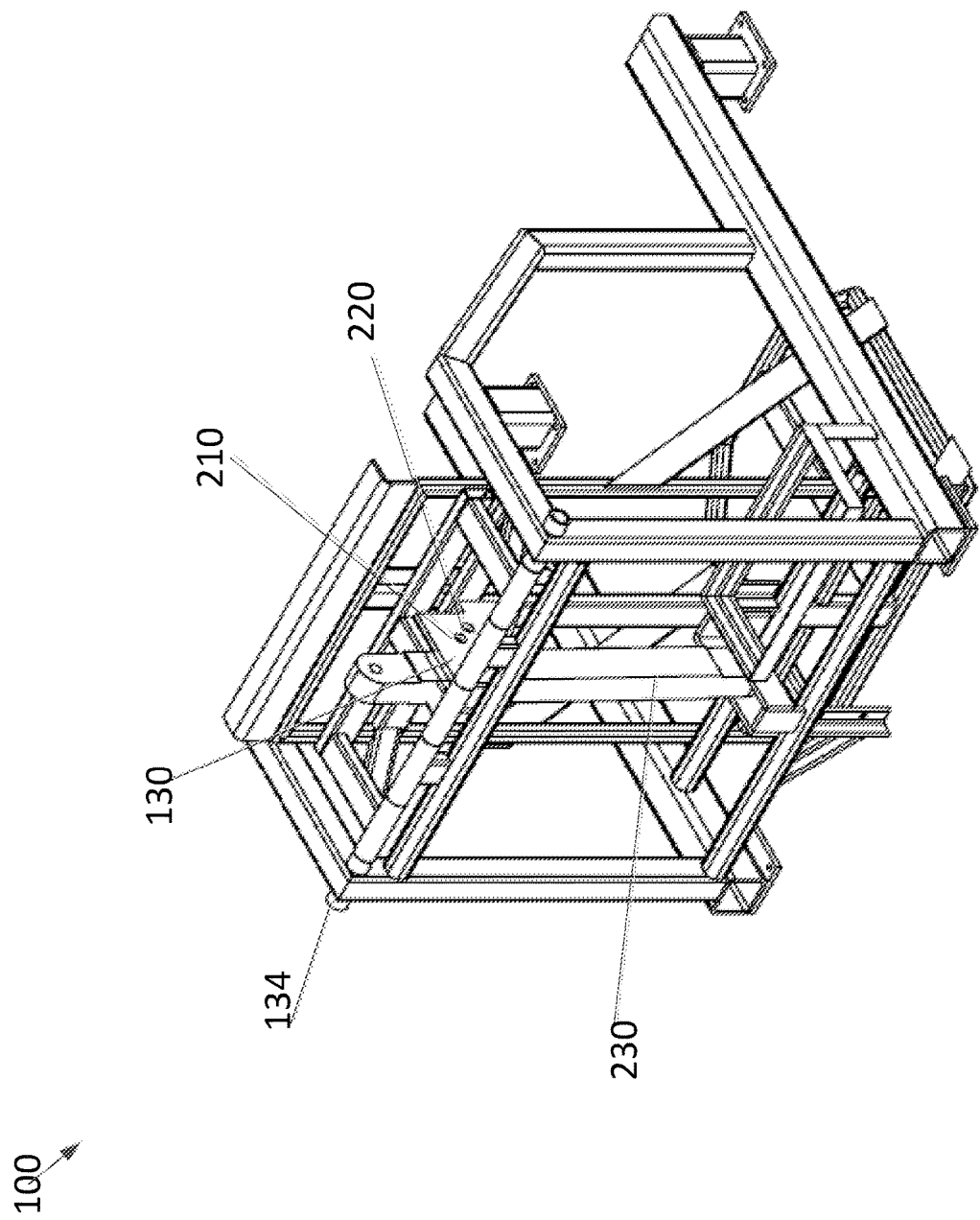
FIG. 2 depicts a back perspective view of mobile bin tipper, according to an embodiment.

FIG. 2 depicts a back perspective view of mobile bin tipper 100, according to an embodiment. Elements depicted in FIG. 2 may be described above, and for the sake of brevity a further description of these items is omitted.

As depicted in FIG. 2, mobile bin tipper may include a hydraulic lift 230 with an arm that is configured to interface with ledge 132 at a first pin hole 210 or second pin hole 220. Responsive to coupling the arm of the hydraulic lift to either first pin hole 210 or second pin hole 220, and moving the arm, the bin positioned on bin lifter 120 may correspondingly move. This may allow the bin to rotate, and empty its contents into a container, wherein the angular movement and final positioning of the bin may be based on the location where the hydraulic arm is coupled to. In embodiments, the positioning of first pin hole 210 and second pin hole 220 may be vertically between hinge 134 and the ground surface, and between frame 110 and front sidewall 122.

Figure 3:
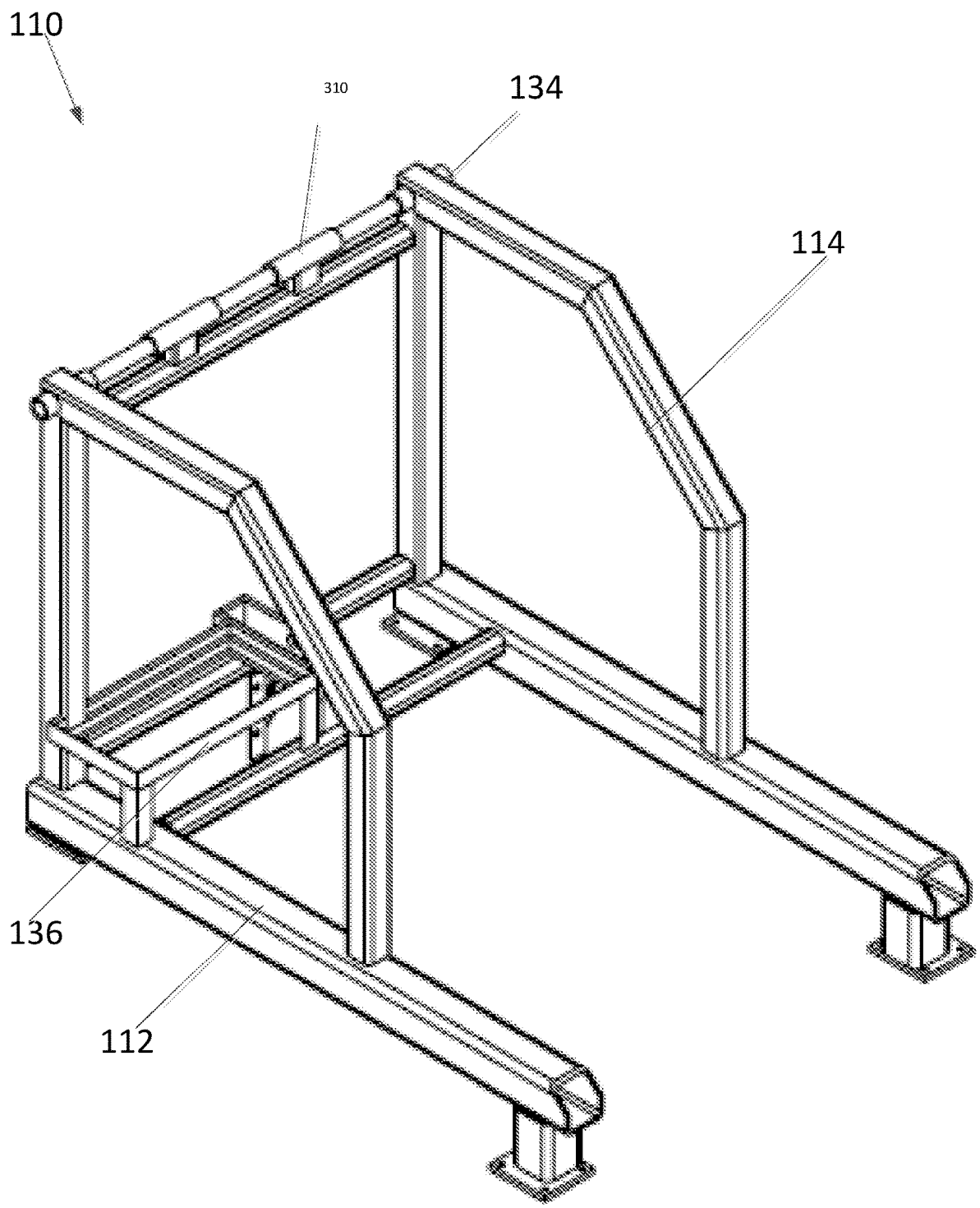
FIGS. 3 and 4 depict a frame, according to an embodiment.
Figure 4:
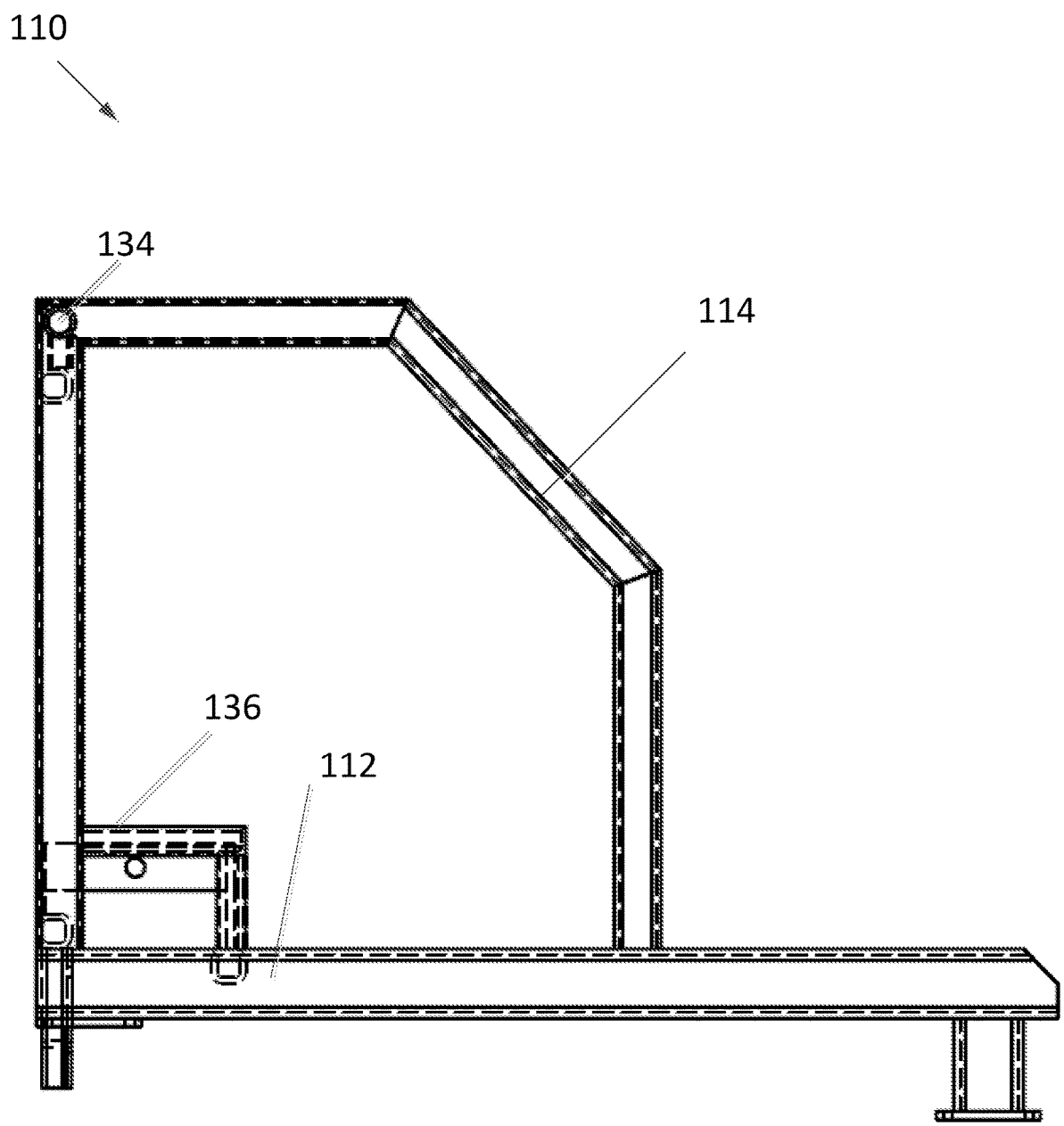

FIGS. 3 and 4 depict a frame 110, according to an embodiment. Elements depicted in FIGS. 3 and 4 may be described above, and for the sake of brevity another description of these items is omitted.

As depicted in FIGS. 3 and 4, frame 110 may have a plurality of hinge holders 310, wherein a hinge 134 may be configured to be inserted through the hinge holders 310. Responsive to inserting the hinge 134 into hinge holders 310, bin receiver 120 may be coupled to frame 110 via lifter 130.

Further, this may allow an the arm of a hydraulic lift to elongate, allowing lifter 130 to rotate around hinge 134, which correspondingly rotates bin receiver 120. This may allow for the contents of a bin to be dispensed into a container.

Figure 5:
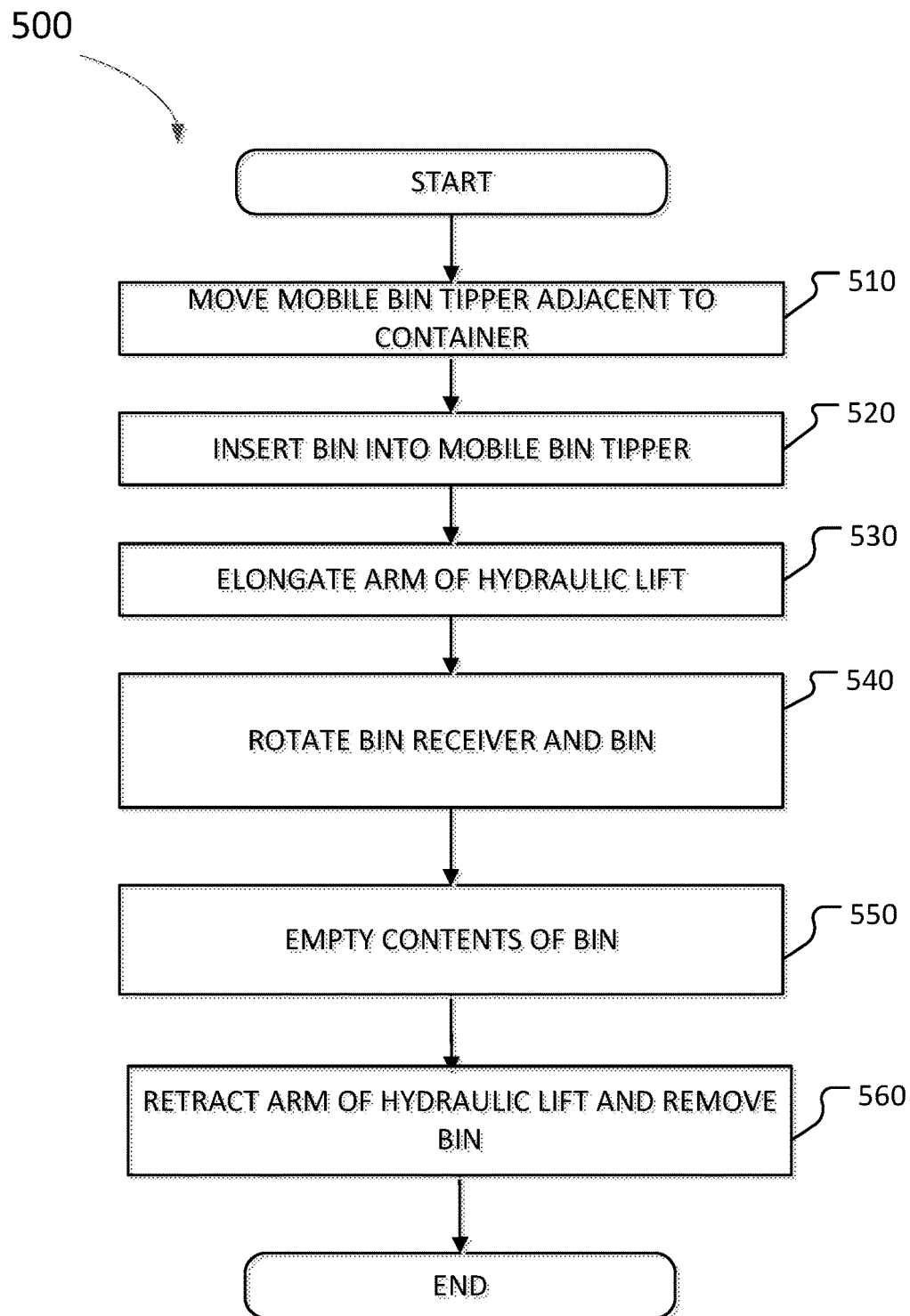
FIG. 5 illustrates a method for utilizing a mobile bin tipper, according to an embodiment.

FIG. 5 illustrates a method 500 for utilizing a mobile bin tipper, according to an embodiment. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a mobile bin tipper may be moved adjacent to a container

At operation 520, a recycling bin may be positioned within the mobile bin tipper. This may allow the mobile bin tipper to move along with the recycling bin. Specifically, the recycling bin may be moved such that a front surface of the recycling bin is positioned adjacent to a front sidewall of a bin receiver. Responsive to positioning the bin within the mobile bin tipper, a lip associated with the bin receiver may be vertically moved to be positioned against a rim of the front surface of the recycling bin. This may apply a compressive force against the rim of the recycling bin to limit the vertical movement of the bin while the bin is being rotated about a hinge.

At operation 530, an arm of a hydraulic lift may be coupled with a selecting pin hole within a ledge of the bin receiver, and the arm of the hydraulic lift may be elongated. This may cause a bin receiver to move, and correspondingly move the bin positioned within the bin receiver.

At operation 540, the arm may continue to elongate, which may rotate the bin receiver and the bin around a hinge in a first direction. This may continue until the rim of the container is positioned downward, towards the container. Further, the bin may be held in place via the lip. In other implementations, the hydraulic arm may be coupled to a pin hole within the ledge that limits the angular rotation of the bin receiver, such that bin receiver may not be able to be completely rotated to a downward angle, or potentially not even completely horizontal. This may be advantageous where it is desirable to limit the maximum height of the recycling bin when it is rotated.

At operation 550, the contents of the recycling bin may be emptied into the container due to the opening of the recycling bin being positioned at a downward angle.

At operation 560, the arm of the hydraulic lift may be contracted. This may cause the bin receiver and the bin to rotate around the hinge in a second direction. This process may continue for multiple bins.

Figure 6:
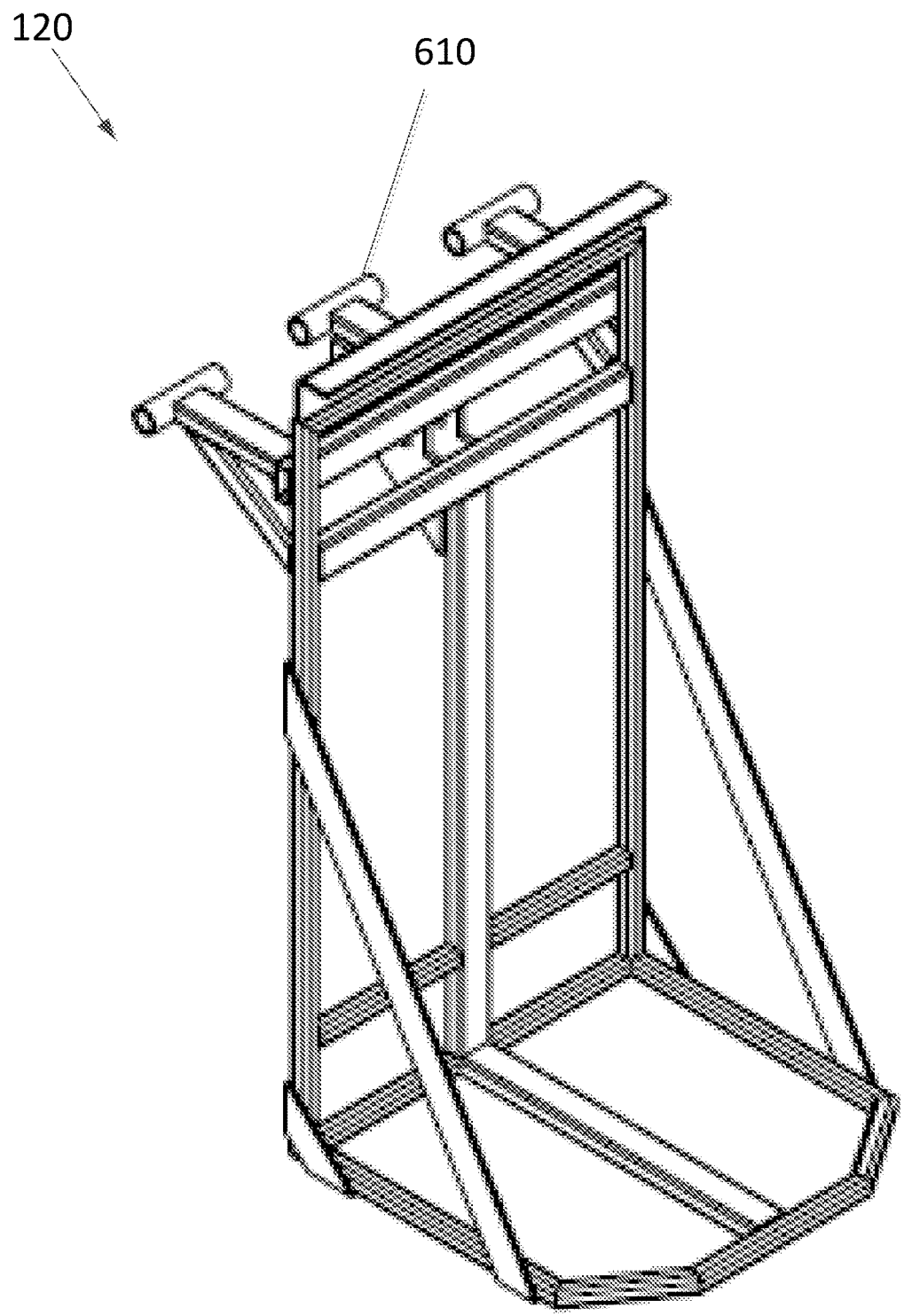
FIGS. 6 and 7 depict a bin receiver, according to an embodiment.
Figure 7:
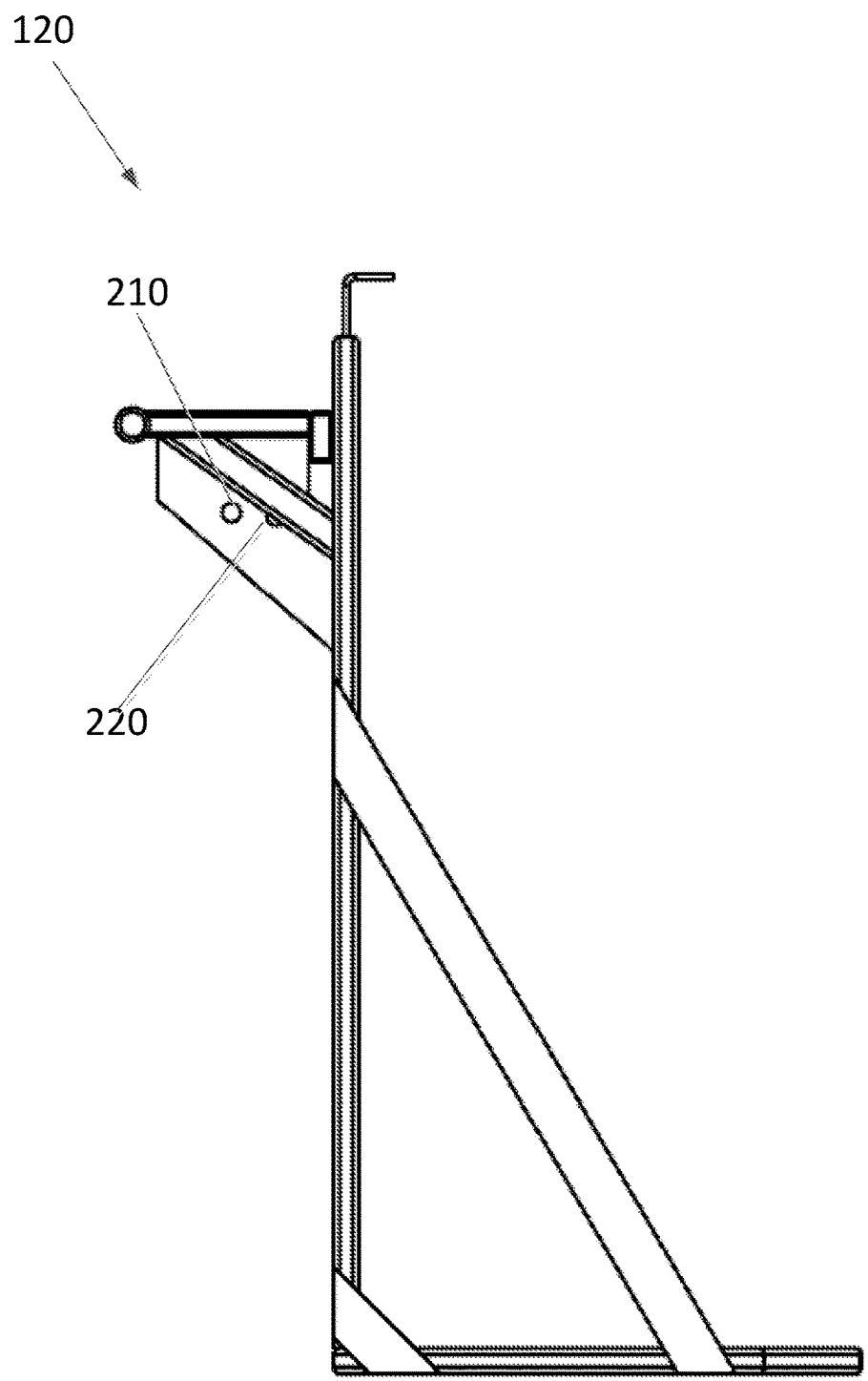

FIGS. 6 and 7 depict a bin receiver 120, according to an embodiment. Elements depicted in FIGS. 6 and 7 may be described above, and for the sake of brevity another description of these items is omitted.

As depicted in FIGS. 6 and 7, bin receiver 120 includes a plurality of hinge receivers 610. Hinge receivers 610 may be tubes that are configured to align with hinge holders 310, such that a hinge 134 may be inserted through hinge receivers 610 and hinge holders 310 to couple bin receiver 120 with frame 110.

Furthermore, as depicted ledge 130 may include a plurality of pin holes 210, 220 that are configured to be coupled with a distal end of the arm of the hydraulic lift. Based on which of In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function).

Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A mobile bin tipper comprising:
   a frame with a base and a cage, the base extending from a proximal end of the frame to a distal end of the frame;
   a bin receiver configured to be positioned within the frame, the bin receiver being configured to rotate;
   a hinge configured to couple the bin receiver with the frame and define an axis of rotation for the bin receiver;
   a lifter coupled to the bin receiver, the lifter being configured to receive a force from a distal end of a hydraulic arm to rotate the bin receiver around the axis defined by the hinge, the lifter being positioned between the proximal end of the frame and a front sidewall of the bin receiver, wherein the lifter includes a plurality of pin holes configured to receive the distal end of the hydraulic arm, each of the plurality of pin holes being positioned at a different horizontal and vertical offset on the lifter.

2. The mobile bin tipper of claim 1, wherein a maximum angular rotation of the bin tipper is based on which of the pin holes the distal end of the hydraulic arm is coupled with, wherein a first pin hole has a first maximum angular rotation and a second pin hole has a second maximum angular rotation.

3. The mobile bin tipper of claim 1, wherein the frame includes first wheel receivers positioned at the proximal end of the frame and second wheel receivers positioned the distal end of the frame, wherein the first wheel receivers and the second wheel receivers are positioned at different vertical offsets.

4. The mobile bin tipper of claim 1, wherein in a resting state a lower sidewall of the bin receiver is positioned vertically below the base, and in a rotated state the lower sidewall of the bin receiver is positioned vertically above the base.

5. The mobile bin tipper of claim 4, further:
including a lip, the lip being configured to be coupled to a front sidewall of the bin receiver and extend in a direction from the proximal end of the frame towards the distal end of the frame, the lip being configured to move vertically.

6. The mobile bin tipper of claim 5, wherein when the bin receiver is in the rotated state the lip moves from a first position between the proximal and distal end of the frame to a second position that extends in front of the proximal end of the frame.

7. The mobile bin tipper of claim 1, wherein the bin receiver includes an angled sidewall, the angled sidewall extending in a downward direction from a front sidewall of the bin receiver to a lower sidewall of the bin receiver.

8. The mobile bin tipper of claim 1, wherein the bin receiver is configured to be positioned between the proximal end of the frame and the distal end of the frame.

9. The mobile bin tipper of claim 1, wherein a first length associated with the base is longer than a second length associated with the bin receiver.

10. A method associated with a mobile bin tipper comprising:
positioning a bin receiver within a frame, the frame including a base and a cage, the base extending from a proximal end of the frame to a distal end of the frame;
receiving, at a lifter coupled to the bin receiver, force from a distal end of a hydraulic arm, the lifter being positioned between the proximal end of the frame and a front sidewall of the bin receiver;
rotating the bin receiver about an axis defined by a hinge responsive to receiving the force, wherein the lifter includes a plurality of pin holes configured to receive the distal end of the hydraulic arm, each of the plurality of pin holes being positioned at a different horizontal and vertical offset on the lifter.

11. The method of claim 10, wherein a maximum angular rotation of the bin tipper is based on which of the pin holes the distal end of the hydraulic arm is coupled with, wherein a first pin hole has a first maximum angular rotation and a second pin hole has a second maximum angular rotation.

12. The method of claim 10, wherein the frame includes first wheel receivers positioned at the proximal end of the frame and second wheel receivers positioned the distal end of the frame, wherein the first wheel receivers and the second wheel receivers are positioned at different vertical offsets.

13. The method of claim 10, further comprising:
positioning the bin receiver in a resting state, wherein in the resting a lower sidewall of the bin receiver is positioned vertically below the base;
rotating the bin receiver to be in a rotated state, wherein in the rotated state the lower sidewall of the bin receiver is positioned vertically above the base.

14. The method of claim 13, further comprising:
vertically moving a lip coupled to a front sidewall of the bin receiver, the lip extending in a direction from the proximal end of the frame towards the distal end of the frame.

15. The method of claim 14, wherein when the bin receiver is in the rotated state the lip moves from a first position between the proximal and distal end of the frame to a second position that extends in front of the proximal end of the frame.

16. The method of claim 10, wherein the bin receiver includes an angled sidewall, the angled sidewall extending in a downward direction from a front sidewall of the bin receiver to a lower sidewall of the bin receiver.

17. The method of claim 10, further comprising:
positioning the bin receiver between the proximal end of the frame and the distal end of the frame.

18. The method of claim 10, wherein a first length associated with the base is longer than a second length associated with the bin receiver.

* * * * *